(Model.)
W. L. CURTIS.
SURVEYING INSTRUMENT.
No. 313,657. Patented Mar. 10, 1885.
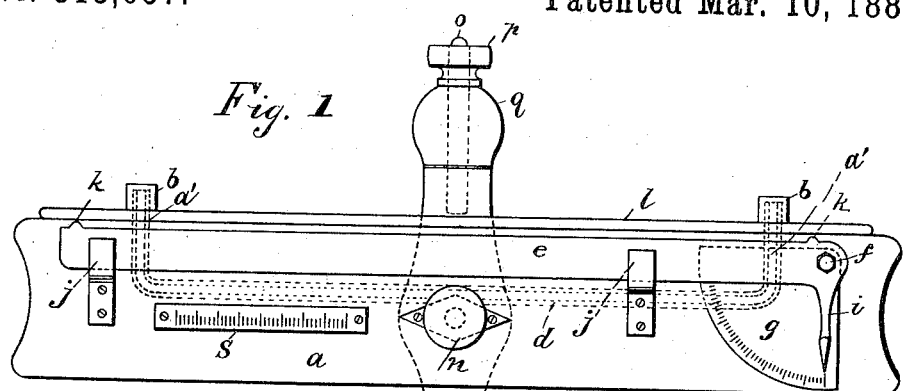
Fig. 1
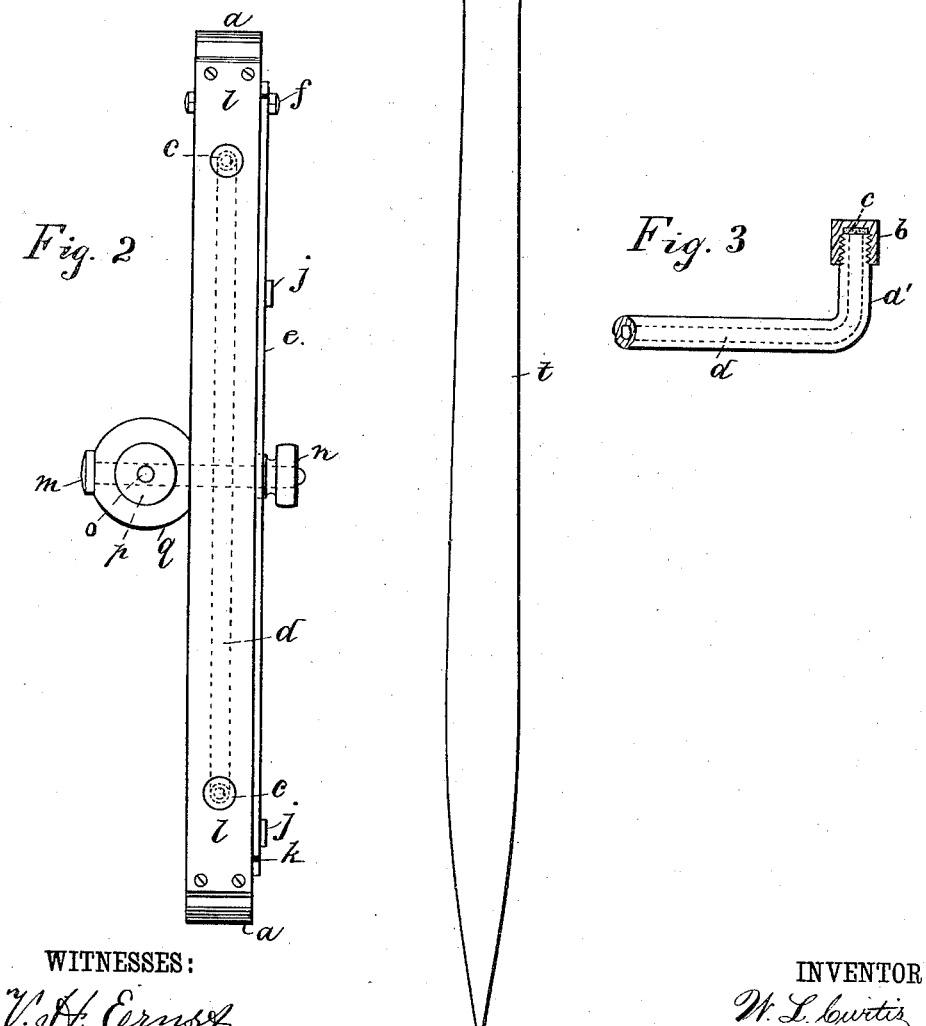
Fig. 2
Fig. 3
WITNESSES:
V. H. Ernst
C. Sedgwick
INVENTOR:
W. L. Curtis
BY Munn & Co.
ATTORNEYS.

United States Patent Office.

WILLIAM LEANDER CURTIS, OF FOREST GROVE, OREGON.

SURVEYING-INSTRUMENT.

SPECIFICATION forming part of Letters Patent No. 313,657, dated March 10, 1885.

Application filed May 27, 1884. (Model.)

*To all whom it may concern:*

Be it known that I, WILLIAM LEANDER CURTIS, of Forest Grove, in the county of Washington and State of Oregon, have invented a new and Improved Surveying-Instrument, of which the following is a full, clear, and exact description.

My invention consists of a level and sight-gage of novel contrivance, together with a variable angle-gage adapted for use as a surveyor's level, and for determining angles in both vertical and horizontal planes and for measuring heights and distances, the whole being very simple and cheap, and also useful and reliable, as hereinafter fully described.

Reference is to be had to the accompanying drawings, forming a part of this specification, in which similar letters of reference indicate corresponding parts in all the figures.

Figure 1 is a side elevation of my improved instrument. Fig. 2 is a top view, and Fig. 3 is a detail.

The letter $a$ indicates a bar of wood similar to the bar of a carpenter's level, but somewhat longer and larger, if desired, in which I arrange a spirit-level device, which I make of two vertical cups, $a'$, set in the upper edge of the bar near each end, respectively, and projecting a little above the surface, with a cap, $b$, screwed on the top to close the same tightly with a flexible packing-disk, $c$, said cups being connected together by a tube, $d$, and being suitably charged with any suitable subtile fluid for the purposes of a spirit-level.

For taking sight the caps are screwed off to enable the instrument to be adjusted by the liquid in the cups. The cups then form the sights. When sight has been taken, the caps are screwed on to retain the liquid.

For a simple means of connecting the cups $a'$ to the bar $a$, I prefer to fit them in a metal plate, $l$, and screw the plate on the upper edge of the bar over a recess made in it to receive the lower portions of the cups and the connecting-tube $d$.

On one side of the bar $a$, I pivot an angle-gage bar, $e$, at $f$, which is the center of a quadrant, $g$, graduated to ninety degrees, and the gage has an index-finger, $i$, that plays along the quadrant to indicate the angle of the gage when turned on the pivot $f$. In the normal position this gage rests in brackets $j$, parallel with the cups $b$ of the level, and said bar is provided with sight-points K. The bar $a$ thus contrived with the level and the angle-gage I pivot at the center to the side of a supporting-staff, $t$, near the top by a pivot-bolt, $m$, permanently fitted in the staff, and a clamping-nut, $n$, by which the bar may be made fast or slack, as required in use. The bar $a$ is to be used on the pivot $m$ to adjust the level and to fold up the instrument when not in use. The rise or fall of the angle-gage measures all vertical angles while the level remains at rest; but for horizontal angles and distances I have provided a vertical pivot-stud, $o$, and clamping-nut $p$ on the top of the staff, to which the bar may be shifted when required. The cup-sights fulfill the same office when measuring horizontal angles, unless, when measuring the latter, it would not, in places, be convenient to reverse the angle-gage, when that might serve to indicate the base-line, and bar $a$ move so that the cup-sights might cover the target or flag. This latter would also occur in the use of the telescope, if it were attached to the bar $a$ instead of the angle-gage.

To make an ornamental finish to the top of the staff when the bar $a$ is mounted on the side pivot, I provide a globular knob, $q$, to take the place of the bar on the pivot. Said knob may also be placed on the side pivot, $m$, when the bar is located on the top.

For convenience in ascertaining the inclinations in feet and decimals thereof of the angles of the gage-bar, I have attached the graduated scale S to the bar $a$, upon which is engraved in feet and decimals the rise or fall to each degree from zero to forty-five degrees on a unit-base of one hundred feet, whereon the inclination per hundred feet may be read at once.

The instrument may have a telescope and compass attached, if desired, and it may also be attached to a surveyor's compass.

The instrument may be made wholly of metal, except the staff, and in different sizes, as may be required.

Having thus described my invention, I claim as new and desire to secure by Letters Patent—

1. In a surveying-instrument, the combination, with the grooved bar $a$, of the plate $l$, the cups $a'$, provided with the caps $b$ and secured in the plate $l$, and the tube $d$, connecting the said cups, substantially as herein shown and described.

2. In a surveying-instrument, the combination, with the staff $t$, of the cups $a'$, provided with the caps $b$, and connected by the tube $d$ and the bar $a$, in which said cups and tube are secured, pivoted to said staff, substantially as herein shown and described.

3. In a surveying-instrument, the combination, with the staff $t$ and the bar $a$, carrying a spirit-level and pivoted to said staff, of the graduated quadrant $g$ and the angle-gage $e$, pivoted to the bar $a$, and provided with the index $i$ and the sight-points $K$, substantially as herein shown and described.

WILLIAM LEANDER CURTIS.

Witnesses:
L. C. WALKER,
BELLE P. WALKER.